(12) United States Patent
Gartelmann et al.

(10) Patent No.: US 7,857,263 B2
(45) Date of Patent: Dec. 28, 2010

(54) LANDING FLAP GUIDE FOR AIRCRAFT

(75) Inventors: Rainer Gartelmann, Bremen (DE); Bodo Zapf, Bücken (DE); Knut Hachmann, Bremen (DE)

(73) Assignee: Airbus Deutschland GmbH (DE)

( * ) Notice: Subject to any disclaimer, the term of this patent is extended or adjusted under 35 U.S.C. 154(b) by 742 days.

(21) Appl. No.: 10/589,120

(22) PCT Filed: Feb. 11, 2005

(86) PCT No.: PCT/EP2005/001391

§ 371 (c)(1),
(2), (4) Date: Apr. 19, 2007

(87) PCT Pub. No.: WO2005/077756

PCT Pub. Date: Aug. 25, 2005

(65) Prior Publication Data

US 2008/0042009 A1  Feb. 21, 2008

Related U.S. Application Data

(60) Provisional application No. 60/606,646, filed on Sep. 2, 2004.

(30) Foreign Application Priority Data

Feb. 12, 2004  (DE) .................. 10 2004 006 940

(51) Int. Cl.
*B64C 3/44* (2006.01)

(52) U.S. Cl. ..................................... 244/213

(58) Field of Classification Search ............... 244/215, 244/216, 213, 214
See application file for complete search history.

(56) References Cited

U.S. PATENT DOCUMENTS

| 3,767,140 | A |   | 10/1973 | Johnson |
|---|---|---|---|---|
| 4,381,093 | A |   | 4/1983 | Rudolph |
| 4,881,704 | A |   | 11/1989 | Hofrichter |
| 5,094,412 | A |   | 3/1992 | Narramore |
| 5,199,538 | A | * | 4/1993 | Fischer et al. ............ 192/223.3 |

(Continued)

FOREIGN PATENT DOCUMENTS

DE  698 114 A  11/1940

(Continued)

OTHER PUBLICATIONS

Haiijiabka, "Surfacing, Building Up," Machine Mechanics, Russia 2000, pp. 385-386.

(Continued)

*Primary Examiner*—Timothy D Collins
*Assistant Examiner*—Joseph W Sanderson
(74) *Attorney, Agent, or Firm*—Lerner, David, Littenberg, Krumholz & Mentlik, LLP

(57) ABSTRACT

The invention proposes a landing flap guide for aircraft, in which the translatory landing flap (1) movement is realized with a glide slide (4) that is supported and guided in slideways of the landing flap carrier (3). The slide (4) is connected to the landing flap (1) and, in order to extend and retract the landing flap (1), guided along the flap carrier (3) by means of at least one glide guide (41, 42, 43, 44).

7 Claims, 2 Drawing Sheets

U.S. PATENT DOCUMENTS

| | | | |
|---|---|---|---|
| 5,230,487 A * | 7/1993 | Gartelmann et al. | 244/216 |
| 5,681,013 A | 10/1997 | Rudolph | |
| 6,076,775 A | 6/2000 | Bauer | |

FOREIGN PATENT DOCUMENTS

| | | |
|---|---|---|
| DE | 1 075 439 | 2/1960 |
| DE | 2 949 293 A1 | 6/1981 |
| DE | 37 13 465 C2 | 11/1983 |
| DE | 197 32 953 C1 | 3/1999 |
| GB | 1 453 476 A | 10/1976 |
| JP | 127969 | 9/1938 |
| JP | 64-067495 | 3/1989 |
| RU | 2022879 C1 | 11/1994 |
| RU | 2181332 C2 | 4/2002 |
| SU | 212759 | 11/1968 |
| WO | WO-03/035469 A | 5/2003 |

OTHER PUBLICATIONS

A.T. Baturin et al. Machinery, Moskow, Mashinostrojeniie 1970, p. 81. (Translation of abstract).

Encyclopedia of Aircraft, Science Publishing House, Big Russian Encyclopedia, TsAGI 1994, pp. 26, 271, 280. (Translation of abstract).

* cited by examiner

LANDING FLAP GUIDE FOR AIRCRAFT

The invention pertains to a landing flap guide for aircraft, wherein a guide element is connected to a landing flap that is supported in a guide rail and can be adjusted between take-off position and landing position.

Landing flaps that carry out a proportional translatory movement are usually guided by a landing flap carriage that is guided on a landing flap carrier. The landing flap carriage needs to absorb all occurring forces that act thereupon in vertical and lateral direction relative to the roller race of the carriage.

This may require a relatively expensive construction with numerous guide rollers that have disadvantages essentially with respect to cost, maintenance and weight.

Consequently, it is an object of the invention to provide a landing flap guide for aircraft that allows for a simplified and statically safe landing flap guide and that is highly reliable.

This object is attained in that the guide element is realized in the form of a slide that can be adjusted in an essentially straight landing flap carrier as guide by means of at least one glide guide of the landing flap carrier.

It is believed that an advantage of this solution can be seen in the fact that the number of movable parts and consequently the number of parts subjected to wear is small. This design not only can be realized with a low weight, but is also cost-efficient with respect to its manufacture as well as its maintenance. Further, it is believed that depending on the forces to be considered, the number of additional guide rolls may be reduced. It may even be possible to obviate further guide rolls.

Advantageous additional embodiments are defined by the features of the dependent claims.

Figure 1:
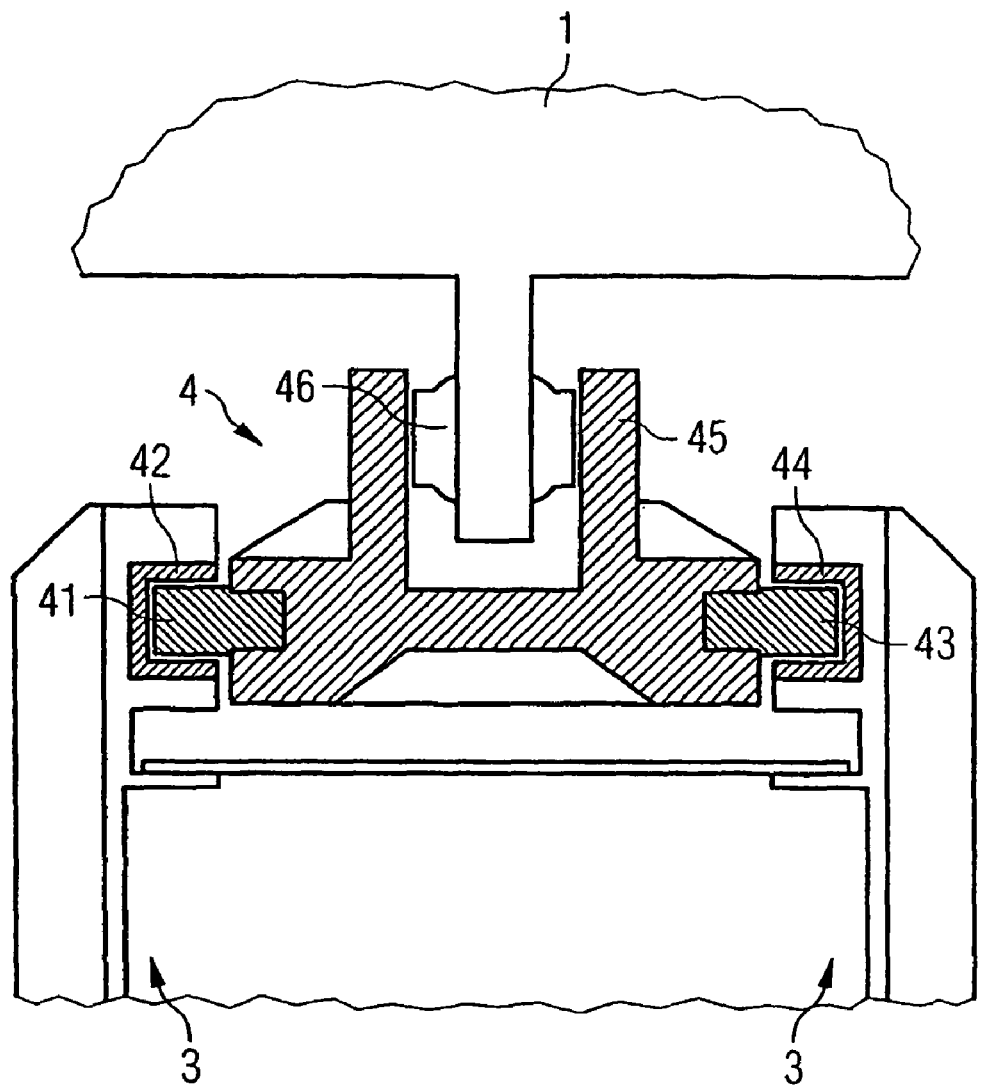
Figure 2:
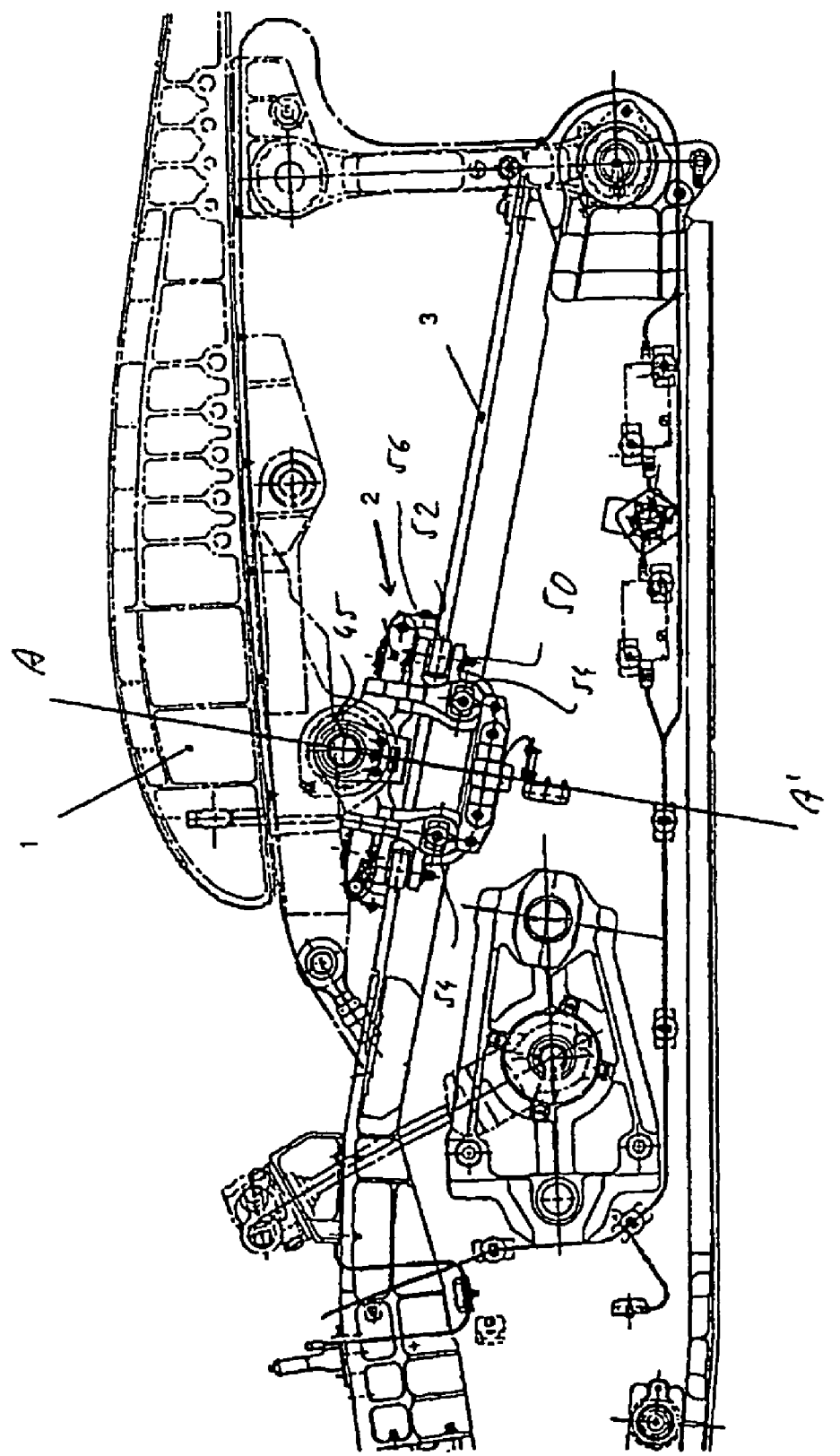

Embodiments of the inventions are schematically illustrated in the figures. The figures show:

FIG. 1, a partial cross sectional view along AA' through the landing flap guide in FIG. 2, FIG. 2, a side view of a landing flap guide.

In the embodiment shown in FIGS. 1 and 2, a landing flap 1 of a landing flap slide 4 is supported and guided in a landing flap carrier 3 on a wing. FIG. 1 is a schematic partial cross sectional view along AA' through the landing flap guide in FIG. 2

In order to extend and retract the landing flap 1, the landing flap 1 is connected to the glide slide 4 and is supported and guided in slideways 42, 44 of the landing flap carrier 3.

In this case, the slide 4 absorbs all forces acting thereupon in, with respect to the guide rail 3, perpendicular and lateral direction.

FIG. 1 schematically shows a landing flap 1 that is connected to a landing flap slide 4 via a rotary joint 45, 46 that is only schematically indicated in the figure, wherein the axis of rotation of the rotary joint 45 lies in the drawing plane.

Gliding elements 41, 43 mounted on the landing flap slide 4 enable the slide 4 to move in slideways 42, 44 of the landing flap carrier 3. The slide 4 directs all forces from the landing flap 1, acting in perpendicular and lateral direction in relation to the slideway, via the glide pairing 41, 42; 43, 44. This means that each glide guide comprises gliding elements 41, 43 that are mounted on the slide, as well as slideways 42, 44 that are mounted on the flap carrier.

The gliding elements 41, 43 and the slideways 42 and 44 form a rail or track system which essentially allows a movement along the slideways only. Thus, according to an exemplary embodiment of the present invention, gliding elements 41, 43 and the slideways 42 and 44 form a rail or track system which allows a translatory movement with essentially only one degree of freedom.

In order to ensure a safe and reliable function of the gliding guide under all realistic environmental conditions, each glide pair must be able to withstand a high surface pressure and must have relatively low and permanent coefficients of static friction and dynamic friction. In addition, each glide pair should be highly resistant to temperature fluctuations, humidity, frost, chemical agents etc. Further, also the wear should be as calculable as possible. Among others, the following materials may be chosen for the gliding surfaces of the glide pairs based on these requirements:

Coated or uncoated metals, ceramics, synthetic materials with embedded ceramics or metals, fiber-reinforced synthetic materials (e.g., CFRP-textile), fiber-reinforced ceramics (e.g., CFRP-textile with SiC), as well as carbon layers applied onto a substrate in a plasma, wherein their hardness can be adjusted between those of graphite and diamond with conventional methods.

According to an exemplary embodiment of the present invention, the gliding elements 41 and 43 which are in engagement with the slideways 41 and 44 may each have an essentially oblong or rectangular cross section. In other words, in FIG. 1, the gliding elements 41 and 43 may extend into the plane of FIG. 1 with an essentially rectangular form. Preferably, the gliding elements 41 and 43 extend essentially parallel to the rails or slideways of the flap carrier 3.

As depicted in FIG. 1, the slideways 42 and 44 may have an essentially U-shaped cross section. Preferably the cross sectional form of the slideways 42 and 44 is adapted to the cross sectional from of the gliding elements. Thus, it may be possible to have differently shaped gliding elements 41 and 43 on both sides of the slide 4 interacting with respectively shaped slideways 42 and 44 to respond to different loads or spatial conditions in the wing.

FIG. 2 is a partial cross sectional view of the wing and shows a side view of the landing flap guide arrangement according to an exemplary embodiment of the present invention.

As may be taken from FIG. 2, the landing flap 1 is guided along rail 3 by means of a sled or sliding arrangement 4. The guidance of the flap 1 on the rail 3 by means of the sled allow a positioning, extending or retracting of the flap.

As already described with reference to FIG. 1, the slide 4 is guided in the rail 3 by means of gliding elements 42 and 43 which are in engagement with the slideways 41 and 44. However, as may be taken from FIG. 2, according to another exemplary embodiment of the present invention, further guiding elements may be provided. As depicted in FIG. 2, lateral guiding elements 52 and 54 may be provided which are adapted to avoid a movement of the slide 4 in a direction essentially laterally perpendicular to the rail 3. In other words, guiding elements 52 and 54, which may be guiding rolls interacting with the rail 3, may be provided to allow for a lateral guidance of the slide 4 on the rail 3. These guiding elements may be attached to the slide 4 by means of respective mounts 50. Furthermore, in another guiding element 56 such a guiding roll may be provided which rolls, in the view depicted in FIG. 2, on the rail 3. In addition to the gliding elements 41, 43 and the slideways 42, 44, this may allow to further restrict a movement of the slide 2 in a direction parallel to AA'. These guiding elements 52, 54 and 56 may even allow to further improve the guidance of the slide in the slideways 42 and 44 since tilting or twisting of the glide elements 41 and 43 in the slideways 42 and 44 may be avoided. This may allow for a smooth and secure guidance of the flap. Furthermore, the provision of the guiding elements 52, 54 and 56 in combination with the slideways 42 and 44 may allow for a secure and reliable flap guide system which may require a reduced amount of maintenance.

The invention claimed is:

1. A landing flap guide for aircraft,
wherein a guide element is connected to a landing flap that is supported in a guide rail and that is adjustable between a take-off position and a landing position, wherein the guide element is realized as a slide that is adjustable in the form of a substantially straight landing flap carrier as a guide by means of at least one glide guide of the landing flap carrier;
wherein the glide guide comprises at least one glide element as well as an assigned recess, into which the glide element extends and in which it is guided in a gliding manner; and
wherein a first and a second glide guide are provided that respectively comprise three glide pairs and are designed for at least absorbing forces that essentially act upon the landing flap carrier perpendicularly.

2. The landing flap guide of claim 1, wherein the air loads exerted by the landing flap are absorbable by a first and a second glide pair and mass forces are absorbable by a third glide pair.

3. The landing flap guide of claim 1, wherein at least one glide guide has glide surfaces that are made of at least one material of the following group: metals with coating, metals without coating, ceramics, synthetic materials with embedded ceramics or metals, fiber-reinforced synthetic materials, fiber-reinforced ceramics, and carbon layers applied onto a substrate in a plasma.

4. A guide for a landing flap of an aircraft, comprising:
a guide element;
a guide rail; and
at least one glide guide, including:
a glide element connected to the guide element, and
a recess element disposed within the guide rail;
wherein the glide element extends into and is guided within the recess element in a gliding manner;
wherein the guide element is connected to the landing flap; and
wherein the guide rail supports the landing flap through the guide element.

5. The landing flap guide of claim 4,
wherein the at least one glide guide is adapted to absorb forces that act substantially perpendicularly upon the guide rail.

6. The landing flap guide of claim 4, wherein the at least one glide guide includes two glide guides adapted to absorb air loads and one glide guide adapted to absorb mass forces.

7. The landing flap guide of claim 6, wherein the at least one glide guide includes at least one glide surface made of at least one material selected from the group consisting of metals with coating, metals without coating, ceramics, synthetic materials with embedded ceramics or metals, fiber-reinforced synthetic materials, fiber-reinforced ceramics, and carbon layers applied onto a substrate in a plasma.

* * * * *